(No Model.) 4 Sheets—Sheet 4.
H. R. ALDEN.
WAVE MOTOR.
No. 602,796. Patented Apr. 19, 1898.
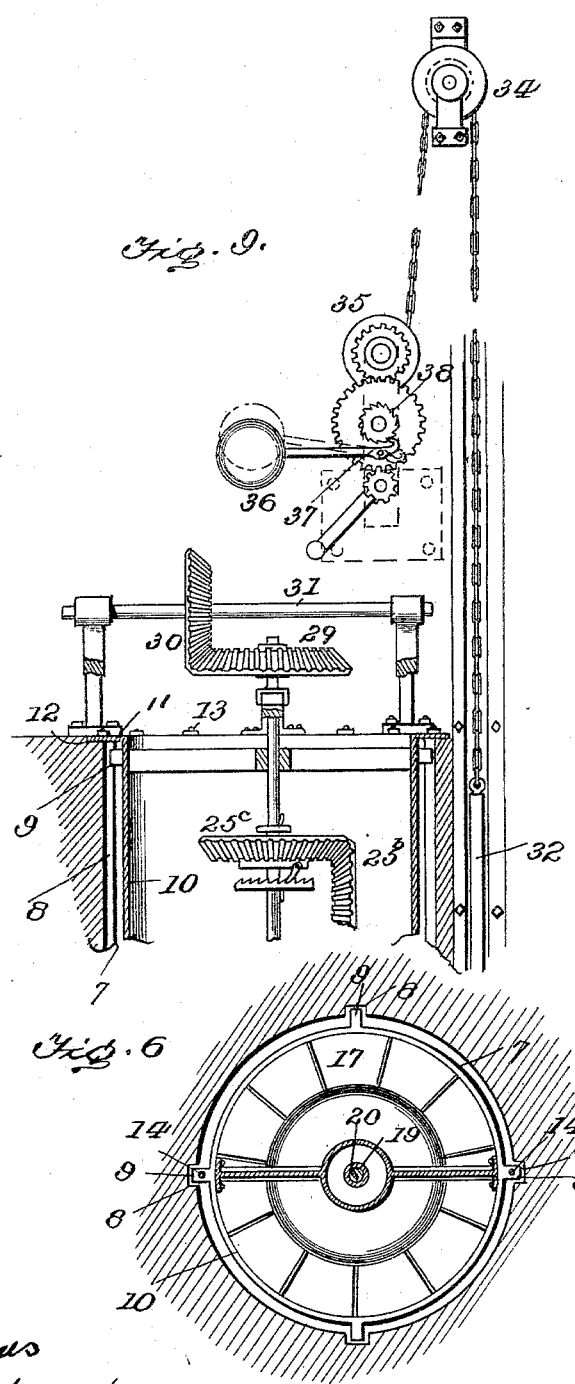

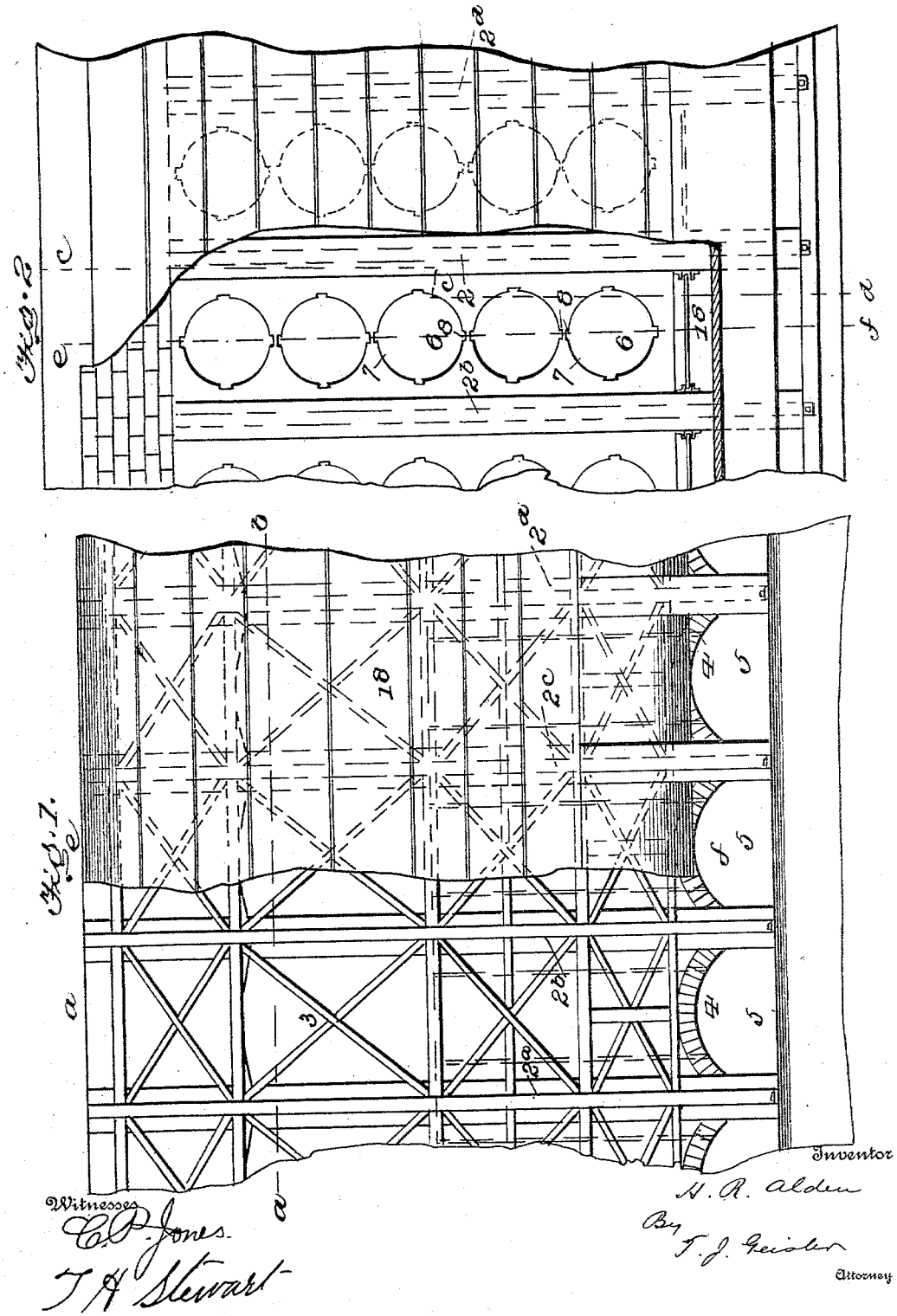

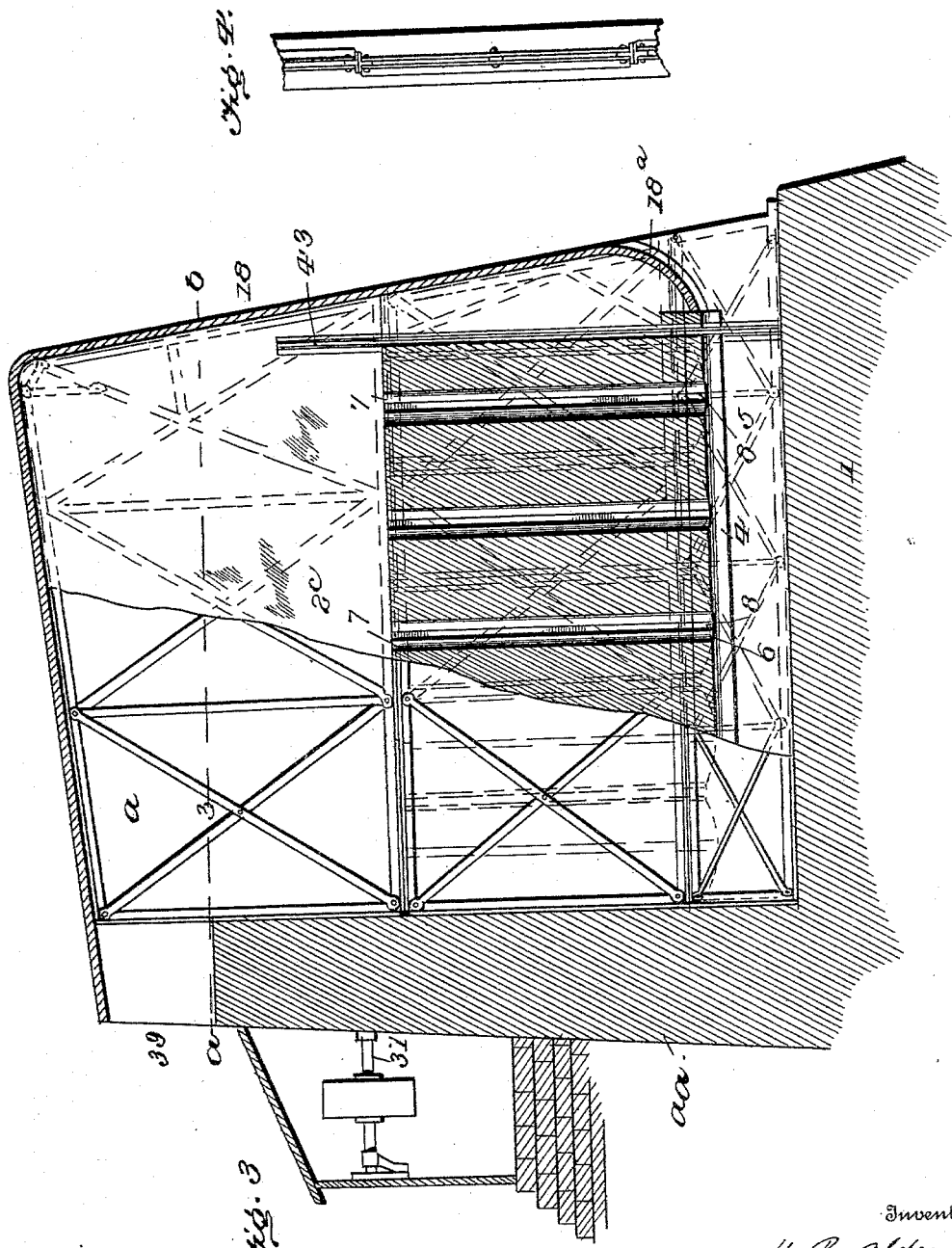

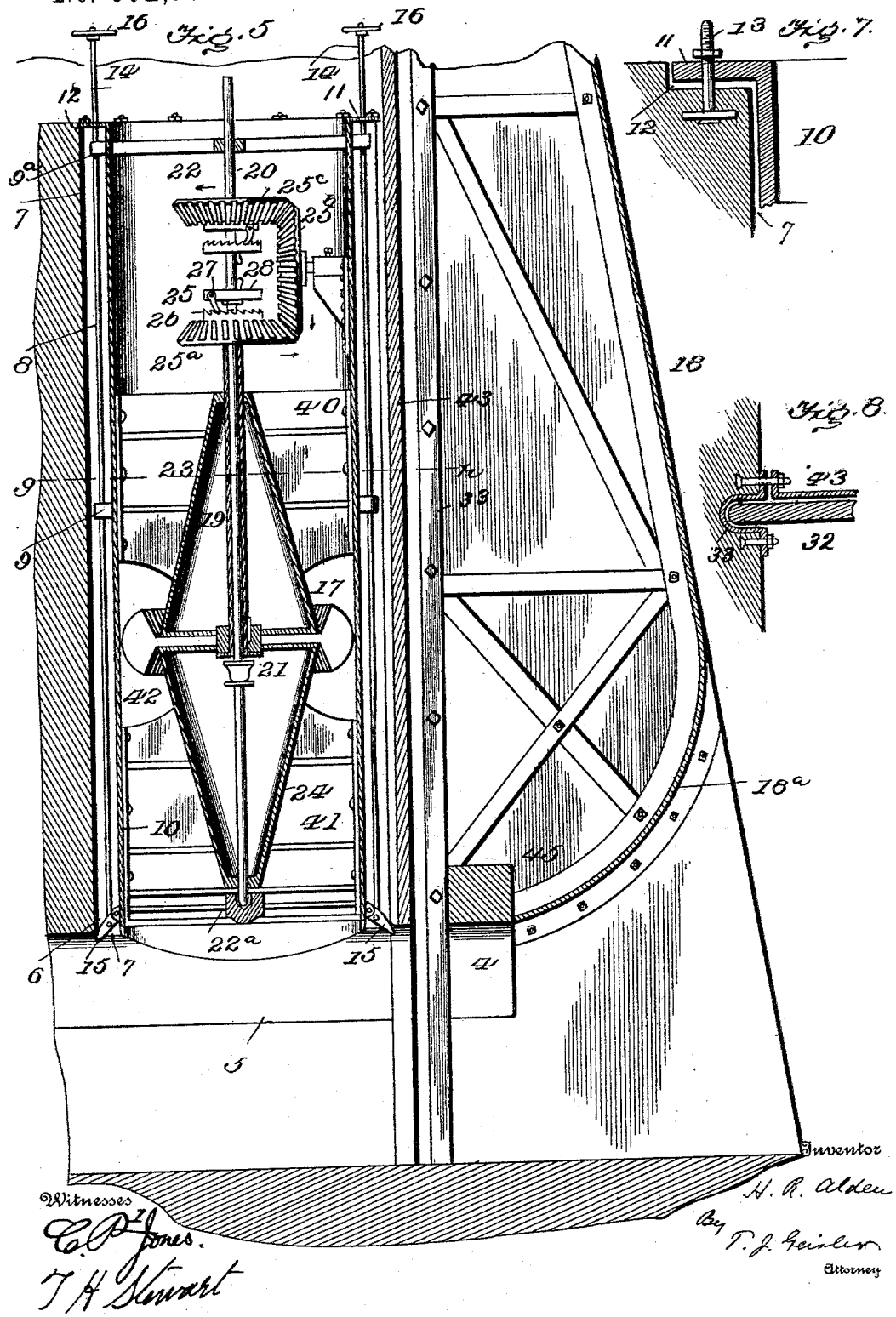

UNITED STATES PATENT OFFICE.

HIRAM R. ALDEN, OF PORTLAND, OREGON.

WAVE-MOTOR.

SPECIFICATION forming part of Letters Patent No. 602,796, dated April 19, 1898.

Application filed May 20, 1897. Serial No. 637,468. (No model.)

*To all whom it may concern:*

Be it known that I, HIRAM R. ALDEN, a citizen of the United States, residing at Portland, in the county of Multnomah and State of Oregon, have invented a new and useful Wave-Motor, of which the following is a specification, reference being had to the accompanying drawings, as forming a part thereof.

My invention relates generally to wave-motors or devices for utilizing the inconstant or irregular motion of the waves on a sea-coast for operating some mechanical motor converting such motion into a constant practical power; and my invention relates especially to that particular class or type of wave-motor heretofore invented by me and disclosed in my application for Letters Patent of the United States, filed February 26, 1897, under Serial No. 625,224.

The object of this invention is twofold: in the first place to contrive a site and power-house in which a series of such motors are connected to a common power-transmitting device, so as to advantageously combine the power generated by them, respectively, and transmit the same in concrete form, and, secondly, to improve, perfect, and simplify the motor of the class mentioned.

In the drawings, Figure 1 is a partial front elevation of my site and power-house, the facing or front being partly removed to show the interior construction. Fig. 2 is a partial plan of such site and power-house, the left half of the figure showing a partial section on the line $a\ b$ of Figs. 1 and 3. Fig. 3 is a longitudinal vertical section on line $c\ d$ of Figs. 1 and 2, showing a portion of the left end of the wall removed, so as to disclose the construction of the framework of such wall. Fig. 4 is a partial end elevation of said framework of the walls, to illustrate a construction thereof. Fig. 5 is an enlarged longitudinal vertical section of one of the well-holes, of the motor contained therein, and its power-transmitting connections. Fig. 6 is a plan section of the parts shown in Fig. 5 on the line $g\ h$. Figs. 7 and 8 are details of construction; and Fig. 9 is similar to Fig. 5, showing the means for transmitting the generated power and the means employed by me for operating the gates which I provide for cutting off the ingress of water to the tunnels or passage-ways, so as to no longer communicate the sea's undulations.

The numbers and letters designate the parts described.

In building my site and the power-house I construct a concrete or solid base or foundation 1 and on this erect a series of perpendicular walls $2^a\ 2^b\ 2^c\ 2^d$, for example, projecting into the sea from a massive rear wall $a\ a$. Such walls may be formed of a series of skeleton piers built of iron and then finished solidly by filling in with cement or other suitable material, and said walls are connected at their lower ends by the arches 4, constituting the roofs for the water-tunnels or passage-ways 5, and have a roof 45 to prevent the longitudinal pits formed between such walls from being flooded by any heavy seas falling over the front of the power-house. The roofs of said tunnels are penetrated by a series of annular openings 6, being the mouths of the well-holes 7. The latter may be constructed by the well-known method of building a temporary frame of the necessary form and then filling in all around the frame between the perpendicular walls with cement and finally destroying said frame. When the well-holes are finished, the lower part of the entire structure above the arches with the exception of the well-holes will be a solid mass, and the extensions of the walls above this are sufficiently braced, so as to make all parts of the structure as strong as possible to withstand the force of the sea.

The walls of the well-holes are provided with a series of vertical grooves 8 in which to receive a corresponding series of lugs 9 on the exterior of the casings 10, which are inserted in such well-holes and contain the motors. (See Fig. 6.)

The casings 10 are tubes of iron having flanges 11, (see Fig. 7,) which are set in the annular depressions 12 therefor provided on the upper edges of the well-holes and are firmly secured by a series of nut-bolts 13, anchored in the walls of such well-holes.

The lugs 9 are provided to serve as stays and to keep said casing in vertical alinement, and the lugs $9^a$ serve the same purpose, all of said lugs having vertically-extending holes to serve as bearings for the rods 14, which are connected to the pivoted toes 15, provided at the base of the casing, the mouths of the well-holes being slightly rounded and such toes bearing against the same, thereby providing additional stays and fastening means for such casing. The apertures in the lugs $9^a$ are threaded. So is that part of the rod 14 extending therein, and the adjustment of such rods and the said toes 15 is accomplished by the wheels 16.

The open spaces between the front ends of the walls $2^a$ $2^b$, &c., are closed by a front transverse wall 18, shown as constructed of plating. The lower extremity of such front wall 18 is curved at $18^a$ inwardly and meets the roofs of the tunnels 5. This arrangement is designed to more readily conduct the water into and through said tunnels.

Each motor comprises but a single water-wheel 17, consisting of a series of slanting blades radiating from their hub or eye. Such wheel is firmly set on a sleeve 19, which runs loosely on the shaft 20, being supported on a collar or flange 21. The beams 22 and $22^a$ furnish the bearings for said shaft 20. The cones 23 and 24 provide means for directing the water, lifting and falling in the well-holes, against the periphery of the blades of the wheel to more advantageously use the power engendered by the oscillations of the water column. The wings 40 41, projecting laterally, provide the means for holding the cones 23 and 24 in place, large spaces being left at 42 to give the water free access to the water-wheel 17. The water-wheel rotates in either direction, responding to the vertical motion of the water column.

The train of bevel-gears 25 provide the means for enabling the wheel 17 to impart its rotary motion to the shaft 20 in whatever direction such wheel may be rotated. To accomplish this, the bevel-gear $25^a$ is fastened on the sleeve 19 and rotates therewith, and the gears $25^b$ and $25^c$ are loose. The gear $25^b$ is a mere transmitter, the remaining gears of the train alternately fastening themselves to the shaft 20 and disengaging themselves again, according to the direction in which the water-wheel may be traveling for the time being. For this purpose the lower gear $25^a$ is provided with an annular ratchet-face projection 26, with which coöperates the pawl 27, depending from the collar 28, fastened to the shaft and rotating therewith, and substantially the same arrangement is applied to the upper gear $25^c$. Thus it is apparent that the rotation of the shaft 20 will always be in the same direction as indicated by the arrow in Fig. 5, for when the wheel 17 rotates to the left the gear $25^a$ will drive the shaft and the gear $25^c$ be a mere idler, while if the wheel rotates to the right the motion will not affect the shaft until transmitted inversely to the upper gear, which then becomes a driver. The arrangement of the water-wheel—i. e., mounting the same loosely on the shaft 20—is particularly designed to give greater freedom of action to said wheel, permitting it to respond quickly to the motion of the water column without wrenching its supporting shaft or the devices coöperating therewith.

The motion of the shaft 20 is communicated through the bevel-gears 29 and 30 to the lying or horizontal shaft 31, which extends over an entire series of water-wheels, all of which are identical in their structure and operation with the one described, and such shaft finally extends through the back wall $a$ $a$ (see Fig. 3) into some room where its power is suitably utilized.

Each tunnel or passage-way 5 is provided with a gate 32 whereby to close the entrance when necessary to stop the transmission of motion from the outer sea to the water columns, and thus stop the motors or a series thereof. The said gates operate in perpendicular grooves formed in the faces of the walls $2^a$ $2^b$, &c., which grooves should be provided with a metal facing 33. The transverse walls 43, which may be constructed of iron plates, extend laterally between the walls $2^a$ $2^b$, &c., and merge at their base into the arches or roofs of the tunnels, outwardly of the first well-hole, and such walls are of sufficient height to inclose the openings necessarily left for the gates to operate in, thereby to shut out the water which would otherwise be admitted through such gate-openings. As means for lifting the gates I provide a pulley 34 and hoisting device 35, on the drum of which the chain is wound. The hoisting device 35 is adapted to automatically disengage the drum in case the water-pit between the walls above the well-holes should be flooded by some abnormally large sea. If such should happen, the hollow ball 36 would be lifted, releasing the dog 37 from the ratchet-wheel 38, releasing the drum, and allowing the gate to close by its own weight, shutting out further seas and preventing damage to the structure. The gate may be balanced by a counterweight, as found desirable, to enable it to be more easily operated.

Ample openings 39 are provided in the rear wall $a$ $a$ at the upper inner ends of walls $2^a$ $2^b$, &c., to furnish an escape for any large volume of water that may be admitted under circumstances referred to.

The same plan of structure above described could manifestly be so modified as to comprise but a single well-hole and motor for each tunnel instead of a series thereof, if such arrangement should be deemed preferable, where but limited power is wanted.

Having described my invention, what I claim is—

1. In a wave-motor, in combination with the casing of an upright shaft supported therein, a sleeve loosely supported on said shaft, a water-wheel mounted on said sleeve, a gear fastened upon said sleeve, a train of loose gears coöperating with said fast gear and automatic clutches adapted to establish a variable connection between said water-wheel and its said shaft, so that the rotation of the shaft will be continuous and constant, whether the wheel itself be rotated to the right or the left, substantially as described.

2. In a wave-motor, in combination with the tunnel or waterway, of a gate and a hoisting device for lifting the same, and means whereby such gate will be automatically released, so as to enable it to drop by its own weight, and close the tunnels, in case of an abnormally large body of water being admitted through said tunnel, substantially as described.

3. In a wave-motor, in combination with the tunnel or waterway, of a gate and a hoisting device for lifting the same, and means whereby such gate will be automatically released, so as to enable it to drop by its own weight and close the tunnels in case of an abnormally large body of water being admitted through said tunnel, and an escape being provided to discharge the excessive volume of water that may collect between the walls above the well-hole, substantially as described.

4. In a wave-motor, in combination with the casing, a vertical shaft supported therein and a water-wheel mounted thereon, adapted to be operated by the oscillations of a column of water, and suitable coöperative connections for said water-wheel and its shaft, of funnel-shaped sheds, 23, 24, to more effectively use the force generated by the water in its oscillations, by directing the same against the periphery of the radial blades of the water-wheel, substantially as described.

In testimony whereof I have hereunto affixed my signature in the presence of two witnesses.

HIRAM R. ALDEN.

Witnesses:
   T. J. GEISLER,
   M. A. OXER.